United States Patent [19]
Love, Jr. et al.

[11] 3,972,428
[45] Aug. 3, 1976

[54] EQUIPMENT TRAILER RAMP CONSTRUCTION

[75] Inventors: Joseph W. Love, Jr., Bonner Springs; Daryl B. Fife, Kansas City, both of Kans.

[73] Assignee: B. H. Mfg., Inc., Kansas City, Kans.

[22] Filed: Dec. 26, 1974

[21] Appl. No.: 536,454

[52] U.S. Cl. ................................. 214/85; 296/61
[51] Int. Cl.² ................................... B65G 67/02
[58] Field of Search .............. 214/85, 85.1; 296/61; 14/71, 72

[56] References Cited
UNITED STATES PATENTS

| | | | |
|---|---|---|---|
| 2,808,291 | 10/1957 | Meter | 296/61 |
| 3,319,811 | 5/1967 | Martin, Jr. | 214/85 |
| 3,352,440 | 11/1967 | Wilson | 214/85 |
| 3,756,440 | 9/1973 | Raap et al. | 214/85 |

*Primary Examiner*—Albert J. Makay
*Attorney, Agent, or Firm*—Fishburn, Gold & Litman

[57] ABSTRACT

A self-storing loading ramp construction for equipment trailers including a pair of ramp members pivotally mounted on the trailer and movable between a loading position, in which the ramps extend rearwardly from the trailer and are inclined from the level of a load carrying surface to the ground, and a tailgate forming position, by pivoting movement in two directions. Lock means engage the ramps in the tailgate forming position and releasably retain same in non-pivoting relation on the trailer.

3 Claims, 6 Drawing Figures

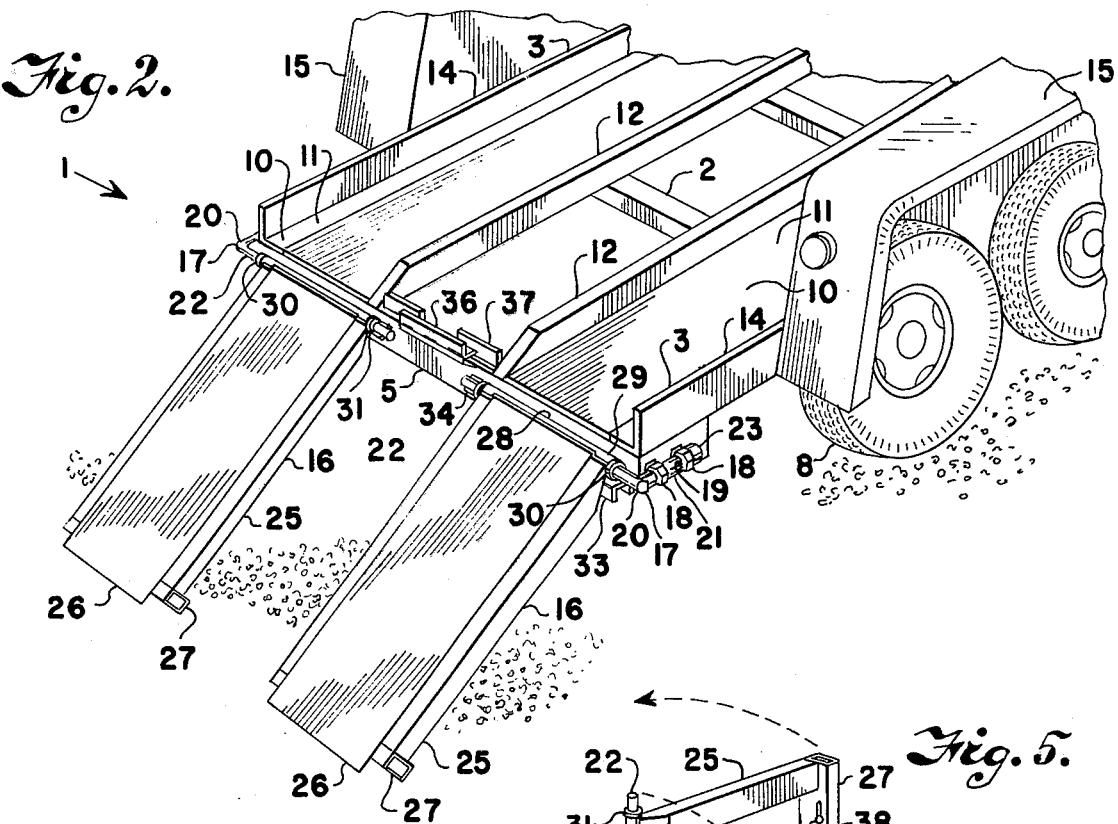
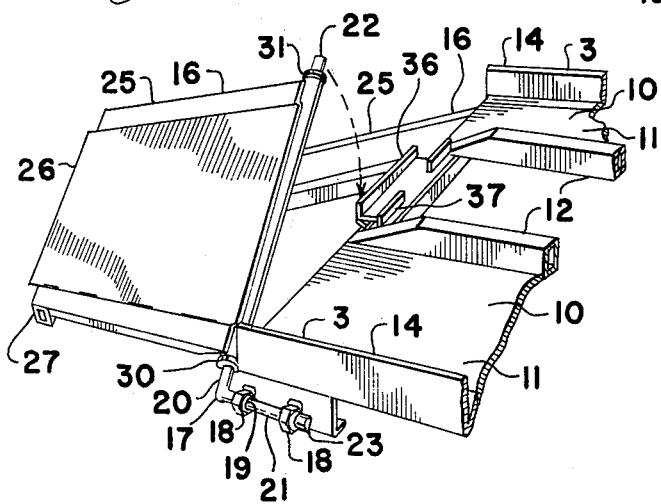

EQUIPMENT TRAILER RAMP CONSTRUCTION

Trailers having loading ramps pivotally mounted thereon are known, for example, the structure disclosed in U.S. Pat. No. 3,319,811 wherein ramps are pivotally mounted for movement about a complex pivot and sliding arrangement between a ramp forming position and a side rail forming position.

The principal objects of the present invention are: to provide a trailer having a pair of pivotally mounted ramps which are movable between a loading position and a lowprofile tailgate forming position; to provide such a ramp structure having a simple pivot arrangement which allows the ramps to move between the two positions without sliding; to provide such a ramp arrangement which is easy to use and requires a minimum of human strength and area for movement of the ramps between the two positions; to provide such a ramp structure which is compact and positive in operaion; and to provide such a trailer and ramp structure which is well adapted for its intended use, inexpensive to manufacture, and sturdy in construction.

Other objects and advantages of the present invention will become apparent from the following description taken in connection with the accompanying drawings wherein are set forth by way of illustration and example, certain embodiments of this invention.

FIG. 2 is a fragmentary perspective view of the trailer showing the ramps in loading position.

FIG. 5 is a fragmentary perspective view showing a ramp in early movement from tailgate toward loading position.

FIG. 6 is a fragmentary perspective view showing the ramp of FIG. 5 just before attaining loading position.

Figure 1:
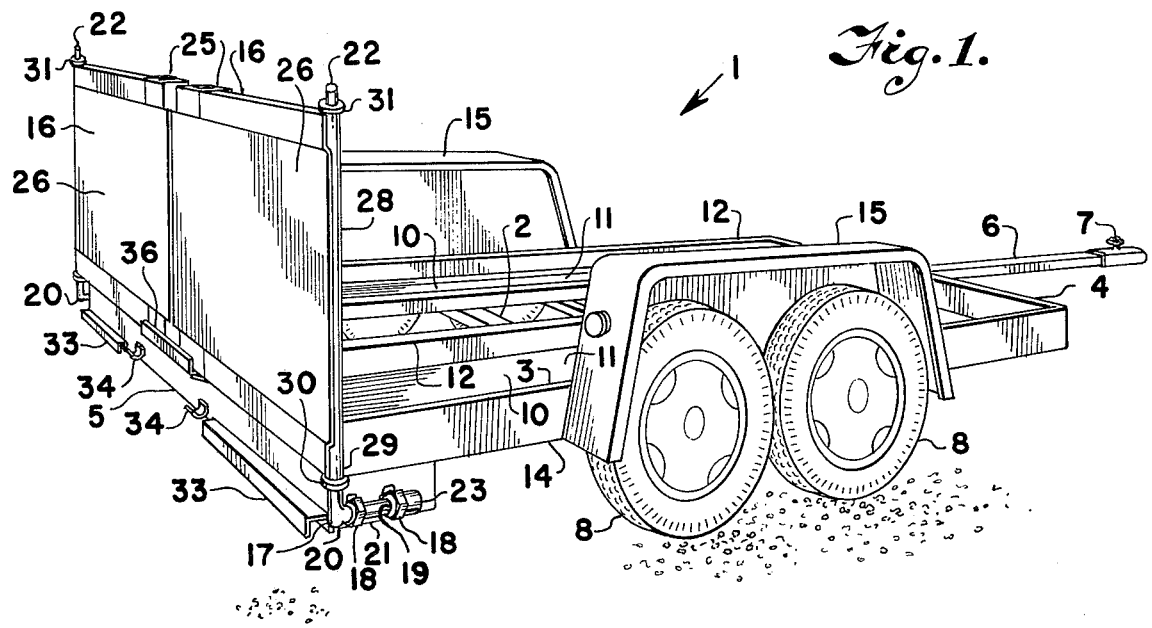
FIG. 1 is a perspective view on equipment trailer showing loading ramps embodying this invention and located in a tailgate forming position.
Figure 3:
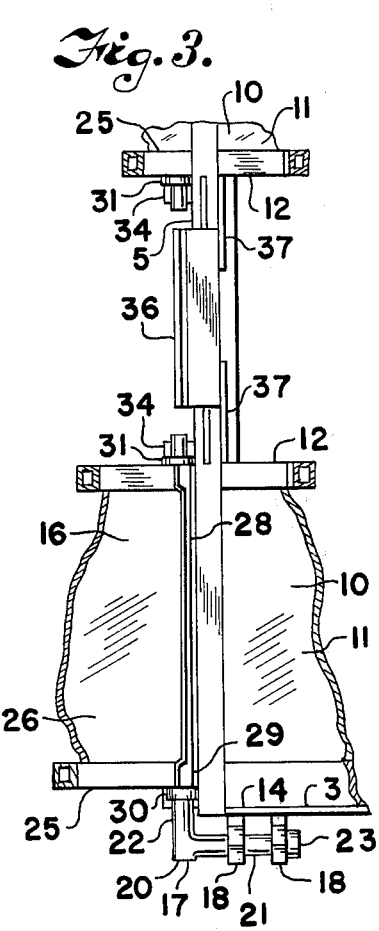
FIG. 3 is a fragmentary plan view on an enlarged scale showing portions of the loading ramp pivoting structure.
Figure 4:
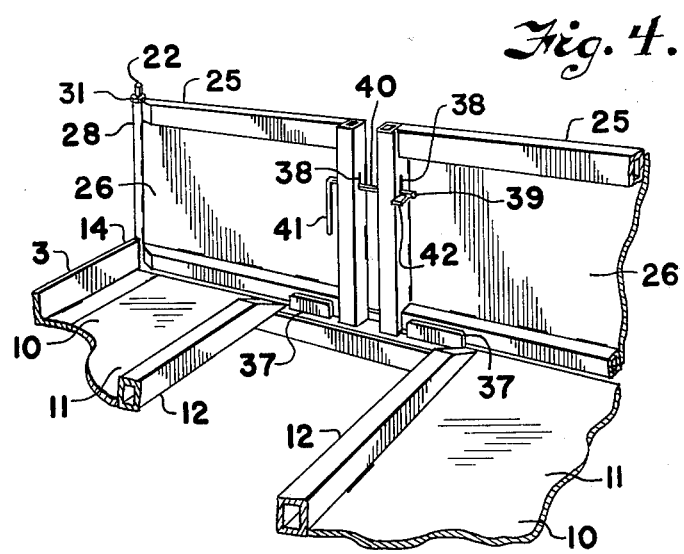
FIG. 4 is a fragmentary perspective view showing the ramps from inside the trailer in the tailgate forming position.

Referring more in detail to the drawings:

The reference numeral 1 designates generally a trailer having a frame 2 comprised of generally parallel and longitudinally extending side frame members 3 and front and rear end frame members 4 and 5 secured to, and extending between, the side frame members 3. A tongue 6 extends forwardly from the front frame member 4 and has a hitch 7 on the forward end thereof for connecting the trailer 1 to a towing vehicle (not shown). A pair of longitudinally spaced axles (not shown) support the trailer frame 2 through suitable wheels 8 rotatably mounted thereon. Bed members 10 form a part of the trailer and extend longitudinally between the front and rear frame members 4 and 5, with each having a load carrying surface 11. In the illustrated structure the bed members 10 are spaced apart, each with upstanding flanges 12 and 14 to help prevent lateral shifting of an object, such as a tractor, carried on the trailer 1. Fenders 15 are secured to the trailer frame 2 and are positioned over respective wheels 8.

The trailer 1 is provided with a pair of ramp members 16 mounted thereon by hinge structure 17 in such a manner as to be pivotally movable in two directions between a ramp forming position as illustrated in FIG. 2 and a low-profile tailgate forming position as illustrated in FIG. 1. The hinge structure 17 includes bearings 18 preferably immovably secured to respective side frame members 3 and positioned adjacent to the rear frame member 5. As shown, the bearings 18 each have aligned bores 19 therethrough with axes extending generally longitudinally of the trailer 1. A pivot arm 20 is generally L-shaped and comprised of a shorter portion 21 extending longitudinally of the trailer and a longer portion 22 extending transversely thereof. The arm portion 21 is received through the respective bores 19 for rotation in the bearing 18. A collar or stop 23 is secured to each of the arm portions 21 and prevents withdrawal of same from the bearings 18. As positioned, the arm portion 22 is movable only in a plane generally transverse to the longitudinal axis of the trailer 1.

The ramps 16 in the illustrated structure are substantially identical, having a frame structure 25 with a load engaging surface 26 thereon. A ground engaging bar 27 extends transversely thereacross at the free end and the other end 28 is pivotally mounted on the pivot arm 20 by means of an elongated cylindrical bearing 29 secured to the end 28. Spaced stops 30 and 31 are fixed to the arm portion 22 respectively adjacent the arm portion 21 and the free end thereof, retaining the ramps 16 against longitudinal movement.

Support angles 33 are secured to the rear frame member 5 and project rearwardly thereof, forming a supporting ledge extending from the respective side frame member 3 inwardly approximately the width of the ramps. The angles 33 support the ramps 16 in the loading position by engaging the ends 28 thereof, whereupon the ramps 16 are inclined downwardly and rearwardly from the respective load carrying surface 11 to the ground. To prevent the ramps 16 from accidentally moving off the support angles 33, upwardly opening hook members 34 are secured to the rear frame member 5 and receive the free end of the arm portion 22 therein.

As best seen in FIG. 1, the ramps 16 can be positioned so as to extend transversely across the rear end of the trailer to form a tailgate. Means are provided to retain the ramp members in the tailgate forming position, and for this purpose upstanding and spaced apart stops 36 and 37 are secured to the rear frame member 5 for receiving portions of the ramps 16 therebetween. The stops 36 and 37 respectively prevent rearward and forward movement of the ramps 16 contained therebetween. Lock means are also provided to prevent the ramps 16 from pivoting on the arm portions 21 in the tailgate forming position. As illustrated, the frame structures 25 of each of the ramps 16 have an oblong opening 38. When the ramp members 16 are in the tailgate forming position, the openings 38 are in alignment and receive a locking key 39 therethrough. Preferably, the key includes a shank portion 40 with a handle portion 41 secured to one end thereof. On the opposite end of the shank 40 a key portion 42 is secured to same and projects, with the handle 41, generally normally to the axis of the shank, however, the key portion 42 and the handle 41 are disposed at different angles. The key 39 is inserted by aligning the key portion 42 with the oblong dimension of the opening 38 and inserting same through the aligned openings 38 whereby upon release of the handle 41 by an operator, same moves to a downwardly depending position, moving the key portion 42 out of alignment with the oblong dimension of the openings 38 and preventing withdrawal of same therethrough. The stops 36 and 37 and the key 39 thereby prevent the ramps 16 from inadvertently being moved out of tailgate forming position.

By way of operation, when it is desired to use the ramps 16 for loading or unloading of the trailer 1, the key 39 is removed from the openings 38 and each of the free ramp ends are moved upwardly by pivoting on the arms portion 21. As best seen in FIG. 5, the ramps are moved a sufficient distance to clear the stops 36 and 37 and then are pivoted on the respective arm portion 22 to a position extending rearwardly from the trailer 1 (FIG. 6), after which the ramps 16 are again pivoted on the respective arm portion 21 until the ends 28 are in engagement with the respective angle 33.

When it is desired to move the ramps 16 from loading position back to tailgate forming position, pivoting is produced on the respective arm portions 21 until the ramps assume a generally vertically disposed position; then pivoting is urged about the arm portions 22 until the ramps achieve alignment between the stops 36 and 37, after which free ends are moved downwardly by pivoting on the arm portion 21. The key 39 may then be inserted as described above.

It is to be noted that a minimum of space is required for moving the ramps 16 from tailgate forming position to loading position. In the tailgate forming position, the ramps extend transversely across the trailer frame and are in generally parallel and end to end relation, closing the rear of the trailer. It is to be further noted that the compound movement of the ramps between the loading position and the tailgate forming position is accomplished with a simple hinge arrangement requiring pivoting only about two axes and without need for sliding or pivoting of the hinge mount.

It is to be understood that while one form of this invention has been illustrated and described, it is not to be limited thereto except insofar as such limitations are included in the following claims.

What we claim and desire by Letters Patent is:

1. A trailer apparatus comprising:
  a. a trailer frame having a rear end member and a side member forming a bed corner,
  b. a ramp positioned adjacent said rear end member and having first and second ends,
  c. means mounting said ramp on said trailer frame for pivotal movement in two directions, said ramp mounting means comprising an L-shaped arm having one arm portion pivotally mounted on said side member for movement about an axis extending generally along said side member and the other arm portion pivotally engaged with one of said ramp ends,
  d. stop means cooperating with said one arm portion fixing same against rearward longitudinal movement,
  e. said ramp being pivotally moveable between a ramp forming position and a second position extending transversely across the trailer frame adjacent the rear end thereof for forming a tailgate,
  f. retaining means cooperating with said ramp for releasably retaining same in said tailgate forming position,
  g. support means secured to said trailer frame and projecting from said rear end, said support means engaging a portion of said ramp adjacent said one end when same is in said ramp forming position,
  h. said ramp being a plurality each being mounted on said trailer frame for pivotal movement and having the other ends thereof in closely spaced relation when said ramps are in said tailgate forming position,
  i. said retaining means including upstanding stops secured to said trailer frame in longitudinally spaced relation and receiving portions of said ramps therebetween when the ramps are in the tailgate forming position for preventing forward and rearward movement,
  j. an opening through a portion of each of said ramps, said openings being in alignment when said ramps are in said tailgate forming position, and
  k. a key receivable through said openings preventing pivoting movement of said first arm portions.

2. A trailer apparatus comprising:
  a. a trailer frame having a rear end member and a side member forming a bed corner,
  b. a ramp positioned adjacent said rear end member and having first and second ends,
  c. means mounting said ramp on said trailer frame for pivotal movement in two directions, said ramp mounting means comprising an L-shaped arm having one arm portion pivotally mounted on said side member for movement about an axis extending generally along said side member and the other arm portion pivotally engaged with one of said ramp ends,
  d. stop means cooperating with said one arm portion fixing same against rearward longitudinal movement,
  e. said ramp being pivotally moveable between a ramp forming position and a second position extending transversely across the trailer frame adjacent the rear end thereof for forming a tailgate,
  f. retaining means cooperating with said ramp for releasably retaining same in said tailgate forming position,
  g. support means secured to said trailer frame and projecting from said rear end, said support means engaging a portion of said ramp adjacent said one end when same is in said ramp forming position, and
  h. an upwardly opening hook secured to said trailer frame adjacent said support means and receiving a portion of said other arm portion therein when said ramp is in said ramp forming position for preventing accidental disengagement of said support means and said ramp.

3. The trailer apparatus as set forth in claim 2 wherein:
  a. said support means includes a support ledge secured to said trailer frame and having an upwardly facing generally planar surface for supporting engagement with said ramp.

* * * * *